Sept. 8, 1925.

J. B. KNUDSEN

VALVE CONSTRUCTION

Filed Jan. 3, 1922

Inventor:
Jacob B. Knudsen
By Jones, Addington, Ames & Seibold Attys.

Sept. 8, 1925. 1,552,710
J. B. KNUDSEN
VALVE CONSTRUCTION
Filed Jan. 3, 1922 2 Sheets-Sheet 2
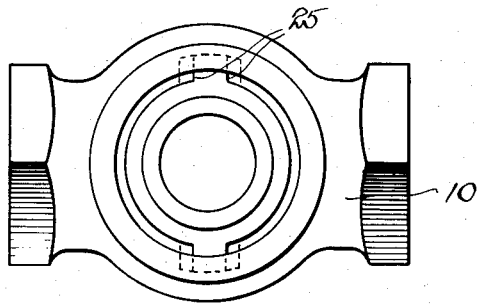
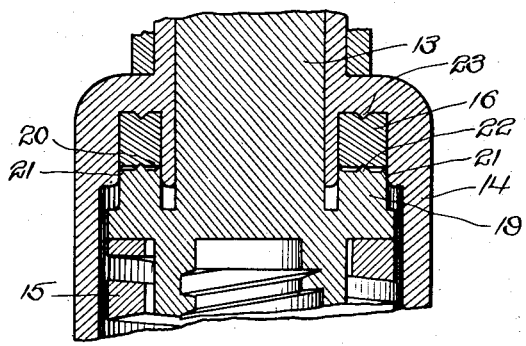
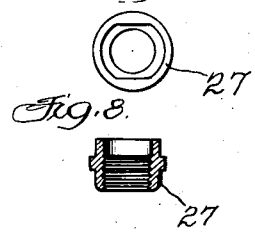
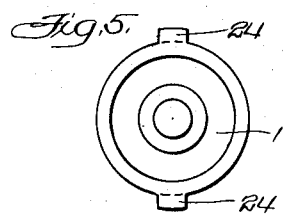
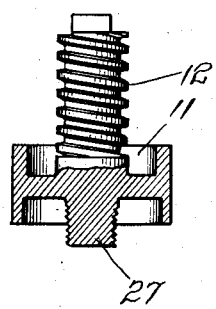
Inventor,
Jacob B. Knudsen
By Jones, Addington, Ames & Seibold Attys.

Patented Sept. 8, 1925.

1,552,710

UNITED STATES PATENT OFFICE

JACOB B. KNUDSEN, OF CHICAGO, ILLINOIS, ASSIGNOR OF ONE-FOURTH TO HAROLD B. KNUDSEN, OF CHICAGO, ILLINOIS.

VALVE CONSTRUCTION.

Application filed January 3, 1922. Serial No. 526,563.

*To all whom it may concern:*

Be it known that I, JACOB B. KNUDSEN, a citizen of the United States, residing at Chicago, in the county of Cook and State of Illinois, have invented new and useful Improvements in Valve Constructions, of which the following is a full, clear, concise, and exact description, reference being had to the accompanying drawing, forming a part of this specification.

My invention relates to valve construction, and more particularly to the packing for the valve stem.

In the previous valve constructions, it has been found that in valves of the type in which a spring is used to press the stem outwardly against the packing, the action of the spring causes the soft metal packing to spread out and bind against the valve stem making the valve difficult to operate.

One of the objects of my invention is to provide a construction which will make it impossible for the action of the spring to cause the soft metal packing to be forced inwardly and bind against the valve stem.

Another of the objects of my invention is to provide a valve construction in which leakage is prevented by providing an extremely tortuous path for the leakage, and by providing a packing in an annular recess which is engaged by an annular flange extending into the recess and bearing on the packing.

Further objects will appear from the detailed description to follow and from the appended claims.

In the drawings in which an embodiment of my invention is shown—

Fig. 3 is a top plan view of the valve casing;

Fig. 4 is a fragmentary sectional view on an enlarged scale showing the packing;

Fig. 5 is a plan view of the valve proper;

Fig. 6 is a side elevation of the valve;

Fig. 7 is a bottom view of a nut which is used to hold the valve disk in position; and Fig. 8 is an axial section of the nut which is shown in Fig. 7.

Figure 1:
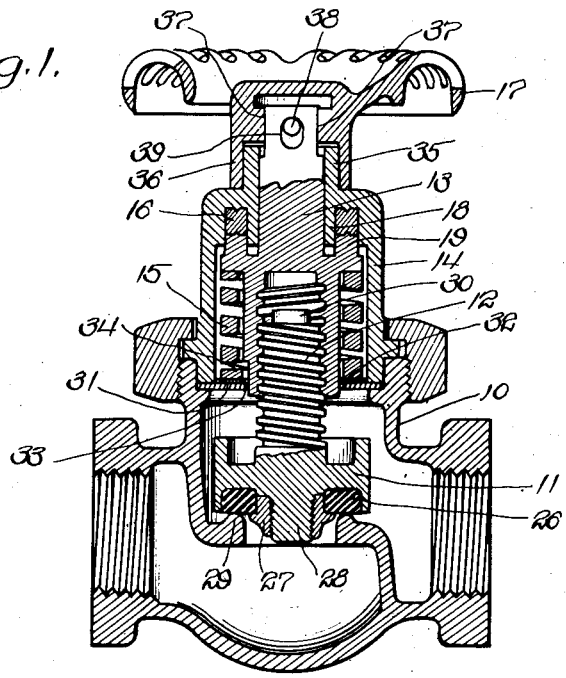
Figure 1 is an axial sectional view through a globe valve provided with my improved packing.

The valve construction shown in the drawings comprises a valve casing 10, the valve proper 11 with its screw-threaded shank 12, the valve operating stem 13 having an axial screw-threaded recess to receive the threaded shank 12, the bonnet 14, through which the stem 13 extends, the spring 15, for forcing the stem 13 outwardly against the packing 16, and the handle 17 for operating the valve stem.

In a valve construction in common use, the annular packing 16 provided to prevent leakage between the valve stem and bonnet, is made to immediately surround the valve stem, so that the upward pressure which the spring causes to be exerted against this packing tends to spread the packing and cause it to bind against the valve stem, making the valve stem hard to turn. In my improved construction, I provide an annular flange 18 between the packing 16 and the stem 13, the packing 16 being located in an annular recess in the bonnet 14, so that it cannot come in contact with the sides of the valve stem to cause it to bind.

In order to effectually confine the packing 16 within the annular recess, the annular flange 19 which extends upwardly or outwardly from an annular shoulder portion on the valve stem is provided with inner and outer annular knife edges 20 and 21 respectively, which tend to squeeze the soft metal packing 16 away from the walls of the annular recess in which it is located, and to effectually confine the packing in the recess in which it is seated. The packing 16 may be of any suitable material, as lead or some soft metal, or any other suitable packing material. An intermediate knife edge 22 is also provided for further positioning and holding the packing in place, the bonnet being also provided with an annular knife edge 23 for a similar purpose.

Figure 2:
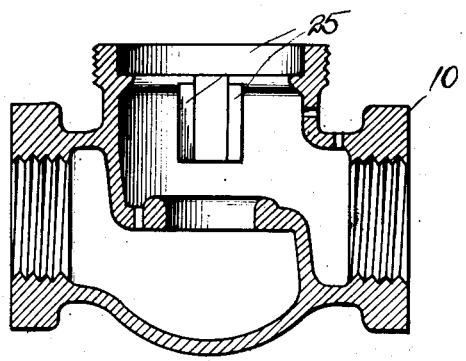
Fig. 2 is an axial sectional view showing the valve casing.

In order to prevent the valve proper 11 from rotating as the stem 13 is rotated, it is provided with oppositely disposed lugs or wings 24 (Fig. 5) which travel between suitable spaced guides 25 (Figs. 2 and 3).

From this construction it results that when the handle 17 is rotated, the valve proper 11 will be caused to travel up or down depending on the direction in which the valve handle 17 is turned. Any suitable valve disc 26 may be provided, which may be held in place by means of a nut 27, threaded onto the screw-threaded shank 28, extending downwardly from the valve proper. The valve disc 26 cooperates with the valve seat 29 in the usual manner.

In order to provide a self-contained construction, and in order to prevent the valve stem 13 from being drawn down from engagement with the packing 16, I provide an extension 30 on the upper end of the screw-threaded shank 12, which engages with the upper end of the screw-threaded recess in the valve stem 13 to limit the upward movement of the valve. If, for instance, the movement of the valve were limited in some other way, as by the valve coming into engagement with the washer 31 which supports the lower end of the spring 15, a further rotation of the valve handle 17, after the engagement of the valve proper 11 with this washer 31, would result in a drawing down of the valve stem 13, and a disengagement of the flange 19 from the packing 16, and a consequent disturbing of the proper relation between the valve stem and packing. However, by the provision which limits the upward movement of the valve 11, by the engagement of the extension 30 with the upper end of the screw-threaded recess, any danger of disturbing the relation between the valve stem 13 and the packing is eliminated.

It will be seen that I have provided a construction which will prevent the possibility of the soft metal packing being squeezed inwardly to bind around the valve stem, and also a construction which will make it practically impossible for there to be any appreciable leakage around the valve stem.

In order to prevent any torsional strain on the spring 15 as the stem 13 is turned, I provide a second washer 32 just above the washer 31, which washer 32 turns with the stem 13 and has a bearing on the washer 31. The turning of the washer 32 is effected by the lug 33 formed on and extending inwardly from the washer 32, this lug engaging in a longitudinal groove 34 in the valve stem. By this construction it will be seen that the washer 32 and the spring 15 will turn together with the valve stem without any torsional strain on the spring.

In order to prevent downward pressure on the valve handle from being transmitted to the valve stem (thus disturbing the proper seating of the valve stem on its packing 16), I provide a sort of loose connection between the handle and stem, which will cause the stem to turn with the handle but will not permit any downward pressure on the handle to be transmitted to the stem, and in order to provide the necessary support for the handle I provide a bearing therefor at 35 on the valve bonnet, the hub of the handle having a flanged portion 36 surrounding and engaging the bearing portion 35. It will be noted that the handle is provided with a web extending above the upper end of the valve stem and spaced therefrom, so that it is impossible to accidently or otherwise exert pressure on the valve stem to disturb the sealing arrangement. In order that turning the handle will cause the stem to turn, the valve stem is flattened at 37, the opening in the handle being correspondingly shaped. With this construction, turning the valve handle will cause turning of the valve stem, but longitudinal play of the valve stem in the handle is permitted. In order to prevent the handle from falling off the stem I provide a pin 38 which extends through registering openings in the hub of the handle and stem 13, the opening 39 in the valve stem 13 being elongated and large enough to permit the spring 15 to force the stem 13 into proper engagement with the packing 16 without being disturbed by the connection between the stem and valve handle. By this construction it will be seen that the leak-proof connection between the valve stem 13 and the bonnet at 16 cannot be disturbed by any pressure exerted on the handle 17.

While I have shown but one embodiment of my invention, it is obvious that it may be embodied in other forms covered and defined by the appended claims.

What I claim as new and desire to secure by Letters Patent of the United States is—

1. A valve construction comprising a valve casing, a valve, a bonnet, a rotatable stem extending through said bonnet for operating said valve, and a spring for forcing said stem outwardly, said bonnet having an annular recess of uniform width for a substantial distance surrounding said stem, and having an annular inwardly extending wall between said recess and stem, said stem being provided with an outwardly extending annular flange extending into and fitting snugly in said annular recess, and an annular soft metal packing in said recess engaged by said annular flange, said inner wall fitting snugly in the space between said annular flange and said stem, said spring pressing said flange against said packing.

2. A valve construction comprising a valve casing, a valve, a bonnet, a rotatable stem extending through said bonnet for operating said valve, and a spring for forcing said stem outwardly, said bonnet having an annular recess surrounding said stem, and having an annular inwardly extending wall between said recess and stem, said stem being provided with an annular shoulder having an outwardly extending annular flange extending into said annular recess, and an annular packing in said recess engaged by said annular flange, said spring pressing said flange against said packing, said flange having a sharp circular knife edge to keep the packing away from the wall of said recess.

In witness whereof I have hereunto subscribed my name.

JACOB B. KNUDSEN.